(12) United States Patent
Branko et al.

(10) Patent No.: US 10,945,552 B2
(45) Date of Patent: Mar. 16, 2021

(54) BEVERAGE MACHINE WITH AN ERGONOMIC WATER STORAGE

(71) Applicant: NESTEC S.A., Vevey (CH)

(72) Inventors: Lukic Branko, Menlo Park, CA (US); Etienne Crozier, La Neuveville (CH); Bertrand Guyon, Saint Point Lac (FR); Kevin Kilpatrick, Mountain View, CA (US); Marco Magatti, Lausanne (CH); Nicolas Obliger, Franey (FR); Steven Ryutaro Takayama, Menlo Park, CA (US); Jean-Luc Thuliez, Le Landeron (CH)

(73) Assignee: Societe des Produits Nestle S.A., Vevey (CH)

( * ) Notice: Subject to any disclaimer, the term of this patent is extended or adjusted under 35 U.S.C. 154(b) by 207 days.

(21) Appl. No.: 16/067,349

(22) PCT Filed: Jan. 6, 2017

(86) PCT No.: PCT/EP2017/050237
§ 371 (c)(1),
(2) Date: Jun. 29, 2018

(87) PCT Pub. No.: WO2017/118713
PCT Pub. Date: Jul. 13, 2017

(65) Prior Publication Data
US 2019/0008312 A1 Jan. 10, 2019

(51) Int. Cl.
*A47J 31/00* (2006.01)
*A47J 31/36* (2006.01)
*A47J 31/44* (2006.01)

(52) U.S. Cl.
CPC ......... *A47J 31/3676* (2013.01); *A47J 31/005* (2013.01); *A47J 31/4403* (2013.01)

(58) Field of Classification Search
CPC ... A47J 31/4403; A47J 31/4457; A47J 31/005
USPC ........................................ 99/284, 302 R, 295
See application file for complete search history.

(56) References Cited

U.S. PATENT DOCUMENTS

| | | | |
|---|---|---|---|
| 5,377,581 A * | 1/1995 | Campbell | A47J 31/005 219/202 |
| 5,957,033 A * | 9/1999 | In-Albon | A47J 31/4403 99/284 |
| 7,249,557 B2 * | 7/2007 | Fouquet | A47J 31/44 99/300 |

(Continued)

FOREIGN PATENT DOCUMENTS

| | | |
|---|---|---|
| CN | 102599810 | 3/2015 |
| EP | 0546626 | 6/1993 |

(Continued)

*Primary Examiner* — Reginald Alexander
(74) *Attorney, Agent, or Firm* — K&L Gates LLP

(57) ABSTRACT

A machine (1) for preparing a beverage has: a body (1') with a fluid line (1",1''') extending from a liquid inlet (1") to a beverage outlet (1'''); a liquid tank (15) that has an outlet (16) connected to the liquid inlet (1"); and a carrier (11,12) assembled to the body (1') for carrying the liquid tank (15). The carrier (11,12) is movable with the liquid tank (15) as a unit (10) inwards into the body (1') into an operative position for supplying liquid to the liquid inlet (1") and outwards from the body (1') into a service position.

17 Claims, 4 Drawing Sheets

(56) References Cited

U.S. PATENT DOCUMENTS

| | | | |
|---|---|---|---|
| 8,397,629 B2* | 3/2013 | Blanc | A47J 31/54 99/302 R |
| 2010/0051532 A1* | 3/2010 | Wawrla | A47J 31/605 210/236 |
| 2010/0218687 A1* | 9/2010 | Anliker | A47J 31/00 99/289 R |
| 2015/0230656 A1* | 8/2015 | Reischmann | A47J 27/00 426/113 |

FOREIGN PATENT DOCUMENTS

| | | | |
|---|---|---|---|
| EP | 2821366 | 1/2015 | |
| EP | 3087880 | 11/2016 | |
| WO | WO-2014118725 A2 * | 8/2014 | A47J 31/44 |
| WO | 2014135438 | 9/2014 | |

* cited by examiner ations, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BEVERAGE MACHINE WITH AN ERGONOMIC WATER STORAGE

CROSS REFERENCE TO RELATED APPLICATIONS

The present application is a National Stage of International Application No. PCT/EP2017/050237, filed on Jan. 6, 2017, which claims priority to International Application No. PCT/US2016/012647, filed on Jan. 8, 2016, the entire contents of which are being incorporated herein by reference.

FIELD OF THE INVENTION

The field of the invention pertains to beverage preparation machines provided with an ergonomic water storage, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Ingredient mixing modules, e.g. brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule. The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO WO2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067. The actuation of the movable part of the brewing device may be motorized, as for example disclosed in EP 1 767 129, WO 2012/025258, WO 2012/025259 and WO 2013/127476.

A beverage machine typically includes a housing containing a beverage processing module and a water tank in fluid communication with the beverage processing module. Examples of such beverage machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488, WO 2007/111884, WO 2009/074553, WO 2010/015427, WO 2011/089210 and WO 2012/055767. Usually the water tank is removable to be refilled by a user when empty. Some systems include a continuous water supply by connecting the beverage machine to the city water distribution network, as for instance disclosed in CN201076369, PCT/EP15/065409, PCT/EP15/065410, PCT/EP15/065411 and PCT/EP15/065414.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, caf latte, americano coffees, teas, etc. . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The machine has a body including a fluid line extending from a liquid inlet to a beverage outlet.

The beverage outlet is typically located above a placement location for a beverage recipient, e.g. a cup or a mug.

The placement location can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198712, EP 2014198710 and EP 2014198715.

The machine is provided with a liquid tank that has an outlet connected to the liquid inlet. The machine has a carrier assembled to the body for carrying the liquid tank.

The fluid line may include at least one of: a liquid sensor, e.g. a flowmeter and/or a pressure sensor and/or a temperature sensor; a pump for driving a liquid from a or said source to the outlet, e.g. a solenoid pump (reciprocating piston pump) or a peristaltic pump or a diaphragm pump; and a thermal fluid conditioner such as a heater and/or a cooler.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The machine typically includes a control unit for controlling the fluid line to supply the beverage to the outlet.

The machine can have a user-interface connected to the control unit. Hence, a user can provide user-instructions to the control unit via the user-interface for operating the machine.

In accordance with the invention, the carrier is movable with the liquid tank as a unit inwards into the body into an operative position for supplying liquid to the liquid inlet and outwards from the body into a service position, such as a service position for filling the tank with liquid and/or cleaning the tank.

By moving the carrier with the liquid tank inwards into the body, the tank is better protected against external stresses or shocks, e.g. resulting from unwanted human movements, disturbing its supply of liquid to the fluid line or, worse, forcing the tank entirely out from the machine.

The machine may include a waste collector for collecting waste material, such as waste ingredient from the fluid line and/or waste liquid from the fluid line, e.g. waste ingredient within a used capsule. The waste collector can be carried by the carrier so that the carrier is movable with the liquid tank and the waste collector as a unit inwards into the body into the operative position for collecting waste material and outwards from the body into the service position for emptying the waste collector, the waste collector being optionally removable from the carrier in the service position. The waste collector can be located adjacent to the liquid tank when carried by the carrier, the waste collector being optionally located between the liquid tank and the body when the carrier is in the service position.

The liquid tank can be removable from the carrier in the service position, the outlet of the liquid tank being disconnectable from the liquid inlet. The tank may include a connector for fastening the tank to the carrier, such as a connector for fastening mechanically and/or magnetically the tank to the carrier. The connector may be located about the outlet and spaced apart therefrom.

The tank can include a handle for lifting the tank and/or for operating a lid of the tank between an open and a closed position. For instance, the handle is movable, e.g. pivotable, into a collapsed position for moving the carrier with the tank into the operative position and is movable, e.g. pivotable, into a deployed position for facilitating seizure of the handle when the carrier with the tank is in the service position.

Likewise, when the machine includes the above waste collector, such collector can either be connected to the tank (and follow the movement of the tank when lifted) and/or fitted with a lifting handle such as a handle that is movable between a collapsed position and a deployed position. When the collector is fitted with a lifting handle, the tank may also be fitted with a lifting handle (as discussed above) or may be connected to the collector (and follow the movement of the collector when lifted).

The carrier may have a holding member holding the tank, and optionally a (or the) waste collector. The holding member can be generally shaped as an arm moving, e.g. sliding, inwards into and outwards from the machine's body.

The liquid inlet of the body's fluid line can be fixed to the carrier, such as to a (or the) holding member holding the tank, and is movable with the carrier.

The body may have an ingredient inlet for supplying to the fluid line, e.g. a mixing chamber comprised in the fluid line, a flavouring ingredient. For instance, the flavouring ingredient is supplied within a capsule to the fluid line.

A suitable mixing chamber may be formed by first and second parts that are relatively moved manually or by a motor e.g. as disclosed in EP 1767129, WO 2012/025258, WO 2012/025259, WO 2013/127476 and WO 2014/056641 and in the references cited above.

Such capsule may be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

Self-opening capsules are for instance disclosed in CH 605 293 and WO 03/059778.

The opening of capsules by a machine's piercing elements of a plate is for example disclosed in EP 512 470 and EP 2 068 684.

Examples of suitable mixing chambers are disclosed in WO 2008/037642 and WO 2013/026843.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts of the mixing chamber.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The machine can have ingredient supply gate that has an open configuration for allowing a transfer of the flavouring ingredient along the ingredient inlet to the fluid line and a closed configuration for preventing the transfer of the flavouring ingredient along the ingredient inlet to the fluid line. For instance, the gate includes an obstacle, such as one or more sliding and/or swing doors, deployed across the ingredient inlet in the closed configuration and at least partly retracted from across the ingredient inlet in the open configuration.

The gate can be movable, such as pivotable and/or translatable, between a position obstructing the ingredient inlet for preventing a passage of the ingredient along the ingredient inlet and a position clearing the ingredient inlet for allowing a passage of the ingredient along the ingredient inlet.

For example, the obstacle forms an ingredient holder, e.g. an ingredient capsule holder, for holding the ingredient prior to the transfer to the fluid line.

The capsule holder may have: a capsule holding configuration for holding an ingredient capsule away from the fluid line; and a capsule releasing configuration for releasing the capsule in or into the ingredient inlet towards the fluid line.

Immediately after releasing a capsule to the mixing chamber, the holder may be passed from the releasing configuration to the holding configuration so that the transfer channel is opened only when needed to release a capsule.

The holder can have a shape complementary to a shape of the capsule.

The holder may have an actuator for passing from the holding to the releasing configuration and vice versa, e.g. an actuator controlled by the control unit.

Details of suitable capsule holders are disclosed in WO 2012/126971, WO 2014/056641, WO 2014/056642 and WO 2015/086371.

The holder may have a capsule sensor for sensing a presence of a capsule on the capsule holder and optionally sensing a type of the capsule. The capsule holder can be controlled by the control unit to automatically release a sensed capsule when the mixing chamber is in the transfer position. When a particular type of capsule is identified, the control unit may adapt the control of the preparation unit of the beverage according to the identified type.

Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

The body may delimit a seat, e.g. a cavity, for receiving the unit in the operative position. For instance, the carrier has an external panel or wall for covering the seat in the operative position.

The carrier, the unit and/or, when present the seat, can comprise or be associated with sensing arrangements, such as at least one of: a water presence or level sensor; waste presence or level sensor; cup presence or recognition sensor. Such sensors may then communicate with a control unit of the machine and trigger various functionalities, e.g. information to a user, allowing or preventing fluid processing, etc. . . . .

The body may have a main outside housing, the carrier, e.g. an (or the) external panel or wall, being generally flush with the outside housing in the operative position.

The beverage outlet can be mounted in an outlet head of the body that is retractable into a rest position and is deployable into a beverage dispensing position. For instance, the outlet head has an external panel or wall that is generally flush with a (or the) main outside housing of the body. Typically, the outlet head will be left in the rest position when the machine is switched-off or in a standby mode or otherwise not in use. Exemplary outlet heads are described in PCT/US15/048691 and PCT/US15/48693.

In an embodiment, the opening of the body inlet is located on the outlet head, or on another retractable part, that is retracted in the body so as to hide the opening of the body when the body is in the inoperative mode. Examples of a retractable opening of a body inlet are disclosed in WO 2009/043630.

In an embodiment, the machine comprises: a bottom that has a periphery, the bottom forming a foot for placing the machine on an external support surface in an orientation for dispensing a beverage via the beverage outlet; and an outside face that is user-visible when the machine is placed on its bottom. Hence, above the bottom, the outside face is not partly hidden by other machine elements to the user. This outside face extends along substantially the entire periphery. The outside face delimits an opening of a body inlet for supplying to the fluid line, e.g. to a mixing chamber comprised in the fluid line, a flavouring ingredient. For instance, the flavouring ingredient is supplied within a capsule to the fluid line. The outside face extends all over the body from the periphery of the bottom to the opening of the body inlet over the bottom to confine the body. The outside face has outwardly protruding edges. The body has an operative mode for driving liquid from the inlet to the outlet and an inoperative mode when such machine is switched-off or in a standby mode. No outwardly protruding edge that is user-visible in the inoperative mode and confined within the outside face, has a radius of less than 5 mm, such as a radius of less than 10 mm, e.g. a radius of less than 20 mm, for instance a radius of less than 30 mm. Optionally, one or more outwardly protruding edges delimited by the outside face and the bottom at the periphery of the bottom and/or one or more outwardly protruding edges delimited by the outside face and the body inlet at the opening of the body inlet has a radius/radii of less than 5 mm, e.g. in the range of 0.1 to 3 mm. Such sharp edges can thus be provided at locations which are not likely to form a catch for an inattentive user.

Hence, at least when the machine of this embodiment is not in use for an extended period of time, i.e. switched-off or in a standby mode, the outside face is free of outwardly protruding sharp and catching edges between the periphery of the bottom and the opening of the body inlet. The machine's protruding edges that are located on the outside face in the inoperative mode are all rounded. Only at the bottom of the machine itself and/or at the opening of the body inlet sharper edges may be provided. It follows that the risk of a user getting unintentionally caught by a sharp machine edge, e.g. formed by a corner or a handle or an outlet or another machine part, upon contacting the machine without being minded to operate it, is significantly reduced or eliminated. It follows that the machine is less exposed of being unintentionally thrown over or down from the external support surface.

One or more outwardly protruding edges delimited by the outside face and the bottom at the periphery of the bottom and/or one or more outwardly protruding edges delimited by the outside face and the body inlet at the opening of the body inlet has no radius of less than 5 mm. Thus it is possible to avoid all sharp edges on the machine's body.

The user-visible outwardly protruding edges confined within the outside face (in the inoperative mode) can all be devoid of any radius of less than 10 mm, such as any radius of less than 20 mm, e.g. any radius of less than 30 mm.

The outside face can be generally convex and/or rounded.

The outside face may be free of outwardly protruding edges, such as sharp edges and/or catching edges.

The outside face can be made of: at least one extremal side, e.g. a front side and/or a rear side; at least two lateral sides extending from the extremal side(s); and at least one top side. For example, the outside face extending from the bottom has a front and a rear side that are connected by two lateral side faces facing each other, the top face extending from upper ends of the front, rear and lateral sides.

The lateral, extremal and top sides can be connected to each other by rounded angles, such as rounded angles having a minimal radius of at least 5 mm, e.g. in the range of 10 to 50 mm.

The machine can comprise a bottom that has a periphery and at least one resilient member at the periphery of the bottom to form a vibration-dampening foot for placing such machine on an external support surface in an orientation for dispensing a beverage via the beverage outlet. The resilient member(s) being water repellent and extending generally along the periphery to prevent passage beyond the member of water-based liquid on the external support surface to underneath the bottom. The water-based liquid can be in the form of spills from the beverage outlet or from the liquid source.

Thus, such elongated water-resistant and resilient member forms a barrier against the passage of liquid to underneath the bottom.

Hence, when liquid is spilled on the external support surface around the machine, such as beverage e.g. residual beverage or liquid from another source near the beverage machine, this liquid is prevented from draining underneath the beverage machine and infiltrating the machine by the presence and configuration of the resilient member that is also water-repellent and forms a barrier against the passage of such liquid.

Depending on the circumstances and construction of the machine, the resilient member can be placed only along part of the bottom's periphery, e.g. under the beverage outlet and/or liquid source, or along the entire bottom's periphery.

The water-repellent and resilient member(s) may extend uninterruptedly on each side of the periphery below the beverage outlet.

The water-repellent and resilient member(s) can extends uninterruptedly on each side of the periphery below the liquid tank.

The resilient member(s) may be in a generally continuous configuration extending generally along the entire periphery or at least along a predominant part thereof, such as extending in an uninterrupted configuration along the entire periphery.

The resilient member(s) at the periphery of the bottom can be configured to space the bottom by no more than 2 mm over the external support surface at the resilient member(s).

A greater or smaller spacing may be provided between the bottom and the external support surface behind the resilient member(s). Typically, however, the spacing will be generally the same.

For instance, the resilient member(s) at the periphery of the bottom is configured to space the bottom by no more than 1 mm, such as no more than 0.5 mm.

The machine can include an outside face extending along substantially the entire periphery and forming: at least one extremal side, e.g. a front side and/or a rear side; and at least two lateral sides extending from the extremal side(s); and at least one top side.

For example, the lateral and extremal and top sides are connected to each other by round or sharp angles. The tank and the outlet can be located at the same or different extremal sides.

The water-repellent and resilient member(s) can extend from under the extremal side(s) at which the tank and the outlet are located and can extend along and under the lateral sides that extend from the extremal sides(s).

A round angle can have a minimal radius of at least 5 mm, e.g. in the range of 10 to 50 mm.

A sharp angle can have a maximum radius of 5 mm, e.g. in the range of 0.1 to 3 mm.

BRIEF DESCRIPTION OF THE DRAWINGS

The invention will now be described with reference to the schematic drawings, wherein.

DETAILED DESCRIPTION

FIGS. 1 to 8 illustrate an exemplary embodiment of a beverage machine 1 in accordance with the invention.

Figure 3:
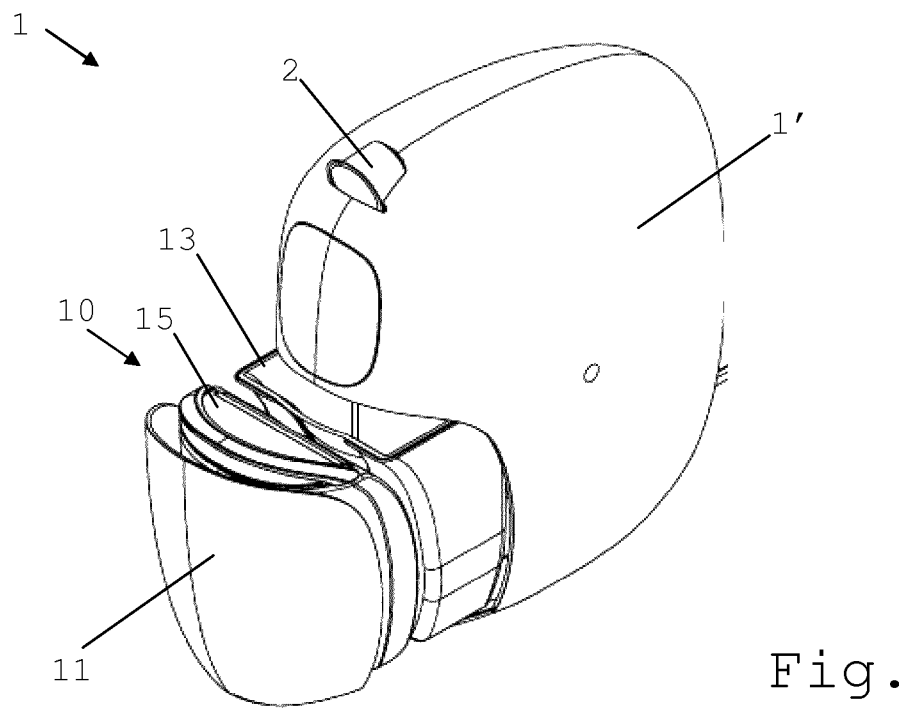
FIG. 3 is a perspective view from above of the machine of FIG. 1 in which the carrier is between the operating position and a service position.
Figure 4:
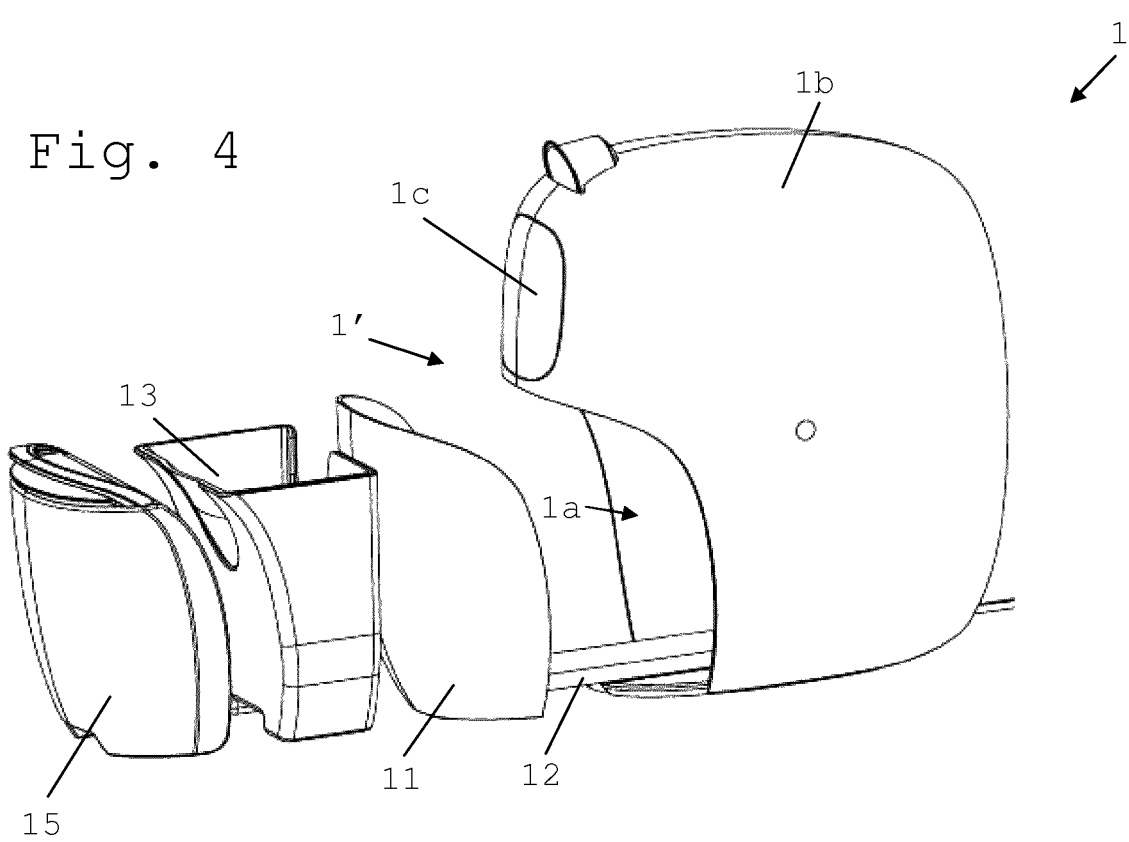
FIGS. 4 and 5 are a perspective view from the side and from above, respectively, of the machine of FIG. 1 in which the carrier is in the service position with the liquid tank removed from the carrier.
Figure 5:
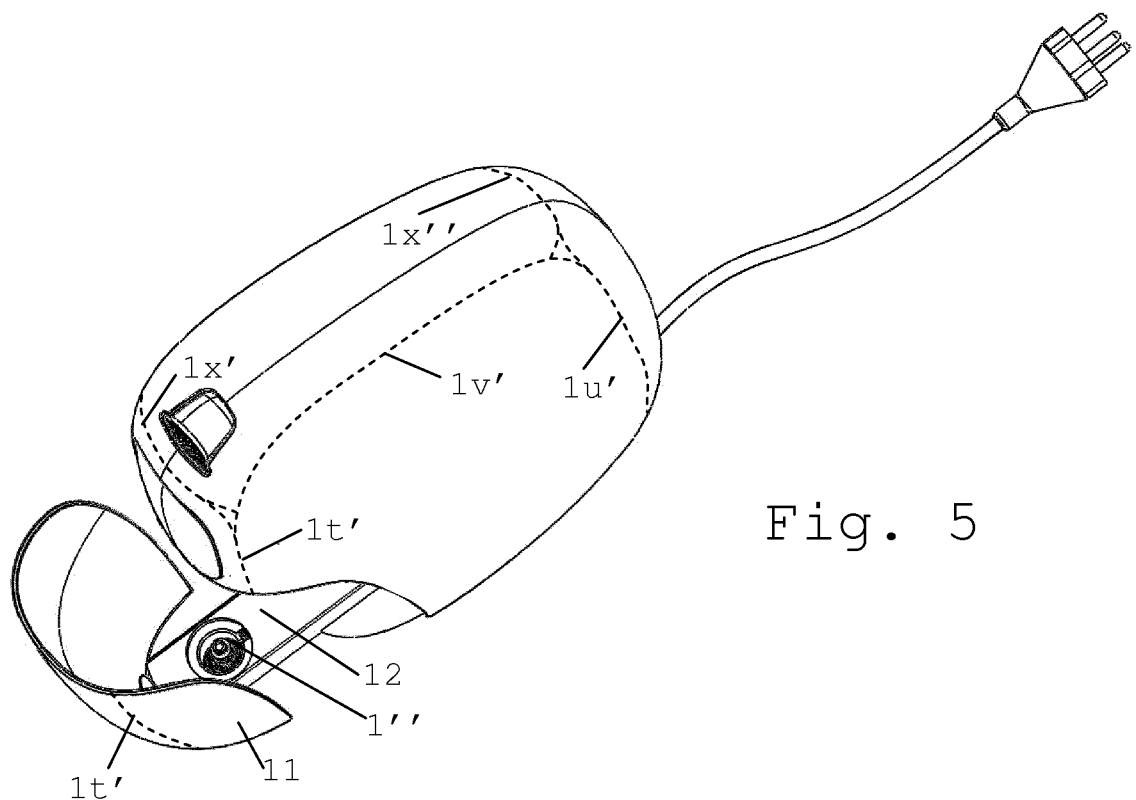
Figure 6:
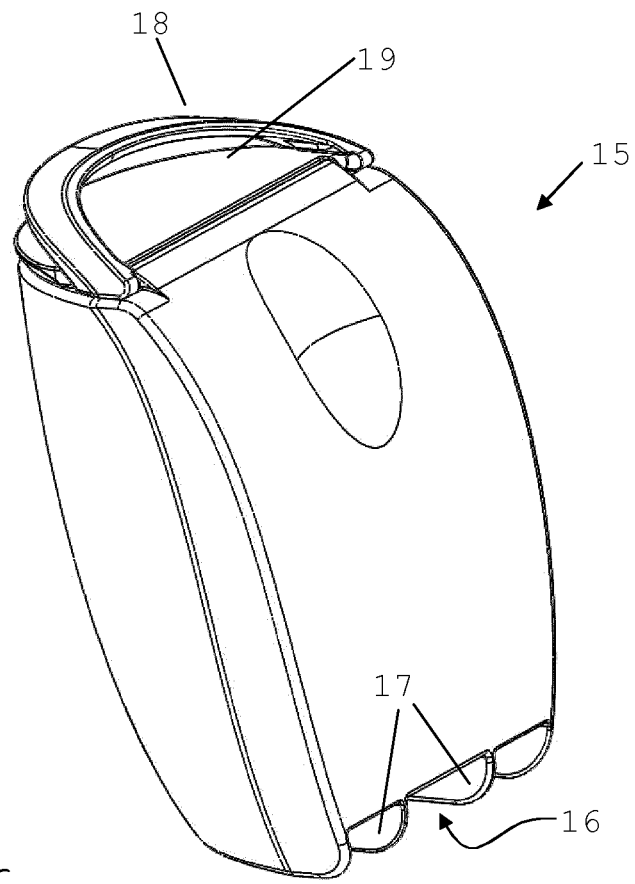
FIG. 6 is a perspective view of the tank after removal from the carrier.

As illustrated in FIGS. 3 and 4, the ingredient may be supplied in the form of an ingredient capsule 2, e.g. of the type described above under the header "Field of the Invention".

Machine 1 has a body 1' that includes a fluid line 1",1''' extending from a liquid inlet 1" to a beverage outlet 1'''. See FIGS. 2 and 5

Machine 1 comprises a liquid tank 15 that has an outlet 16 connected to liquid inlet 1". See FIGS. 3, 5 and 6.

Machine 1 includes a carrier 11,12 assembled to body 1' for carrying liquid tank 15. See FIGS. 3 to 5.

Carrier 11,12 is movable with liquid tank 15 as a unit 10 inwards into body 1' into an operative position for supplying liquid to liquid inlet 1" and outwards from body 1' into a service position, such as a service position for filling tank 15 with liquid and/or cleaning tank 15. See FIGS. 2 to 5.

Machine 1 typically includes a waste collector 13 for collecting waste material, such as waste ingredient from the fluid line and/or waste liquid from the fluid line. See FIGS. 3 and 4.

Waste collector 13 can be carried by carrier 11,12 so that carrier 11,12 is movable with liquid tank 15 and waste collector 13 as a unit 10 inwards into body 1' into an operative position for collecting waste material and outwards from body 1' into a service position for emptying waste collector 13. Waste collector 13 can be removable from carrier 11,12 in the service position. See FIG. 3.

Waste collector 13 can be located adjacent to liquid tank when carried by carrier 11,12. For instance, waste collector 13 is located between liquid tank 15 and body 1' when carrier 11,12 is in the service position. See FIG. 3.

Liquid tank 15 may be removable from carrier 11,12 in the service position. See FIG. 4.

Outlet 16 of liquid tank 15 can be disconnectable from liquid inlet 1". See FIG. 5.

Tank 15 may include a connector 17 for fastening tank 15 to carrier 11,12, such as a connector 17 for fastening mechanically and/or magnetically tank 15 to carrier 11,12. For instance, connector 17 is located about outlet 16 and spaced apart therefrom. See FIGS. 5 and 6

Tank 15 can include a handle 18 for lifting tank 15 and/or for operating a lid 19 of tank 15 between an open and a closed position. For instance, handle 18 is movable, e.g. pivotable, into a collapsed position for moving carrier 11,12 with tank 15 into the operative position and is movable, e.g. pivotable, into a deployed position for facilitating seizure of handle 18 when carrier 11,12 with tank 15 is in the service position. See FIGS. 3, 4 and 6.

Likewise, when machine 1 includes the above waste collector 14, such collector can either be connected to tank 15 (and follow the movement of the tank when lifted) and/or fitted with a lifting handle such as a handle that is movable between a collapsed position and a deployed position. When the collector is fitted with a lifting handle, the tank may also be fitted with a lifting handle (as discussed above) or may be connected to the collector (and follow the movement of the collector when lifted).

Carrier 11,12 may include a holding member 12 holding tank 15, and optionally a or said waste collector 13. See FIGS. 3 to 5.

Holding member 12 may be generally shaped as an arm moving, e.g. sliding, inwards into and outwards from the machine's body 1'. See FIG. 5.

Liquid inlet 1" of body's fluid line 1",1''' is fixed to carrier 11,12, such as to a or said holding member 12 holding tank 15, and is movable with carrier 11,12. See FIG. 5.

Body 1' can have an ingredient inlet 1e for supplying to fluid line 1",1''', e.g. a mixing chamber comprised in the fluid line, a flavouring ingredient. For instance, the flavouring ingredient is supplied within a capsule 2 to fluid line 1",1'''. See FIG. 1.

Machine 1 may include an ingredient supply gate 1e' that has an open configuration for allowing a transfer of the flavouring ingredient along ingredient inlet 1e to fluid line 1",1''' and a closed configuration for preventing the transfer of the flavouring ingredient along ingredient inlet 1e to fluid line 1",1'''. For instance, the gate includes an obstacle 1e', such as one or more sliding and/or swing doors, deployed across ingredient inlet 1e in the closed configuration and at least partly retracted from across ingredient inlet 1e in the open configuration. For instance, obstacle 1e' forms an ingredient holder, e.g. an ingredient capsule holder, for holding the ingredient prior to the transfer to the fluid line 1",1'''. See FIG. 1.

Body 1' may delimit a seat 1a, e.g. a cavity 1a, for receiving unit 10 in the operative position. For instance, carrier 11,12 comprises an external panel or wall 11 for covering seat 1a in the operative position of carrier 11,12. See FIGS. 4 and 5.

Body 1' may include a main outside housing 1b, carrier 11,12, e.g. an or said external panel or wall 11, being generally flush with outside housing 1b in the operative position of carrier 11,12. See FIG. 1.

Beverage outlet 1''' can be mounted in an outlet head 1c' of body 1' that is retractable into a rest position and is deployable into a beverage dispensing position. For instance, outlet head 1c' has an external panel or wall 1c that is generally flush with a or main outside housing 1b of body 1'. See FIGS. 2 and 4.

Figure 1:
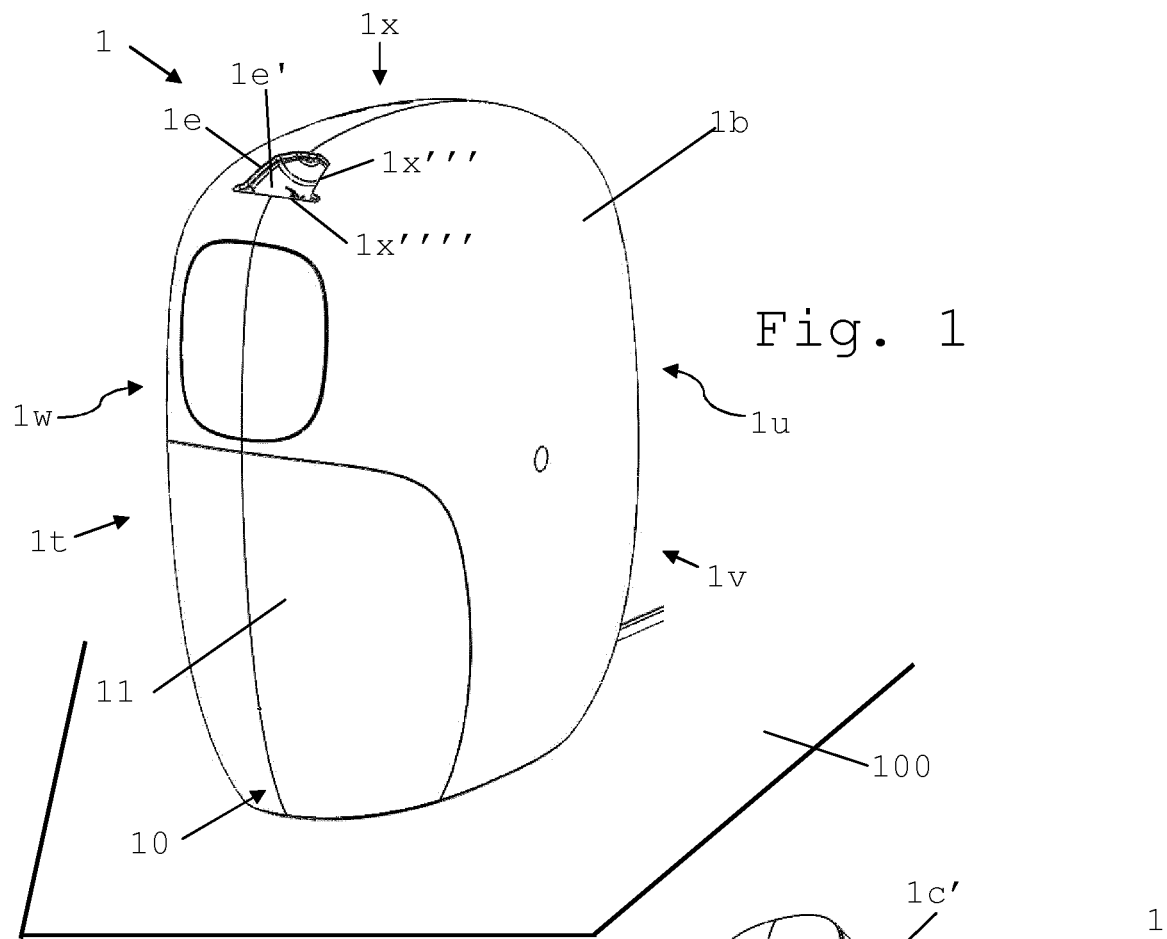
FIG. 1 is a perspective view from the side of a machine according to the invention having a dispensing head and a carrier retracted within the machine.
Figure 2:
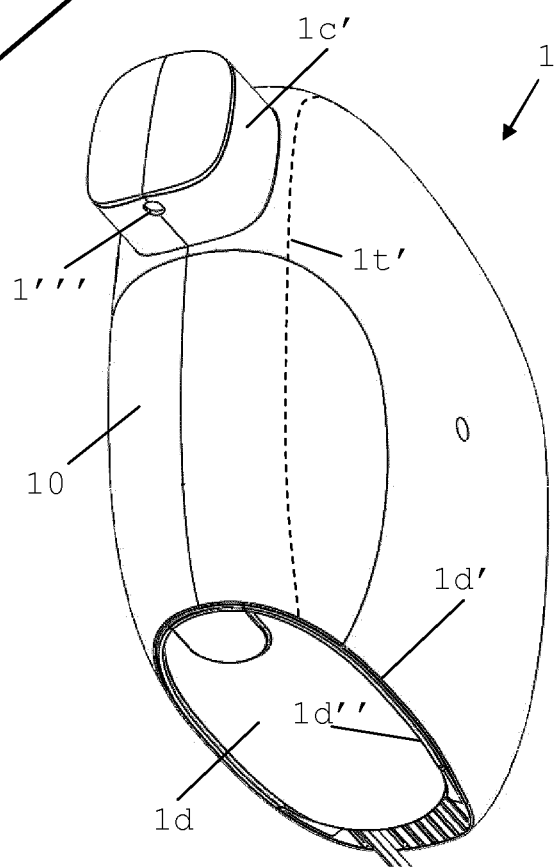
FIG. 2 is a perspective view from below the machine of FIG. 1 in which the dispensing head is in a deployed position and the carrier in the operative position.
Figure 7:
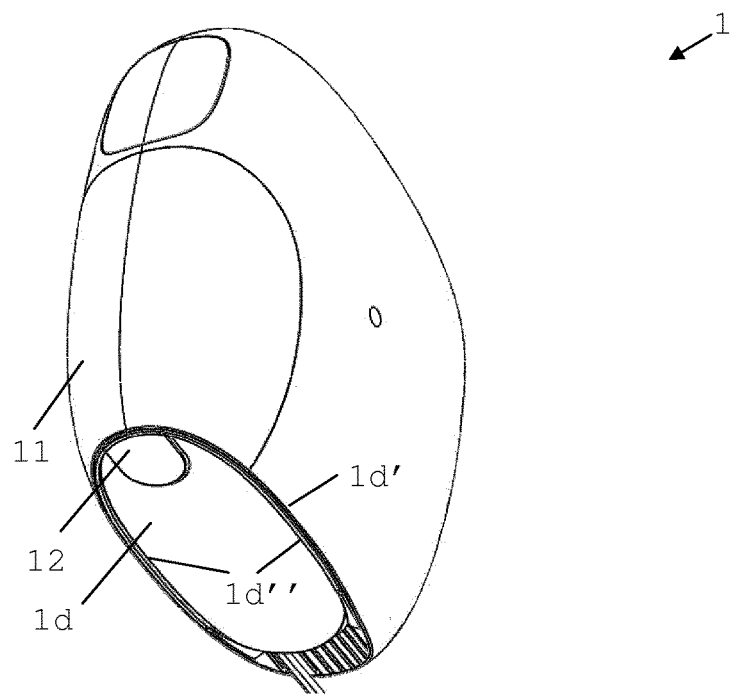
FIG. 7 is a perspective view from below of the machine of FIG. 1 showing the bottom of the machine, an enlarged view of the bottom being shown in FIG. 8.
Figure 8:
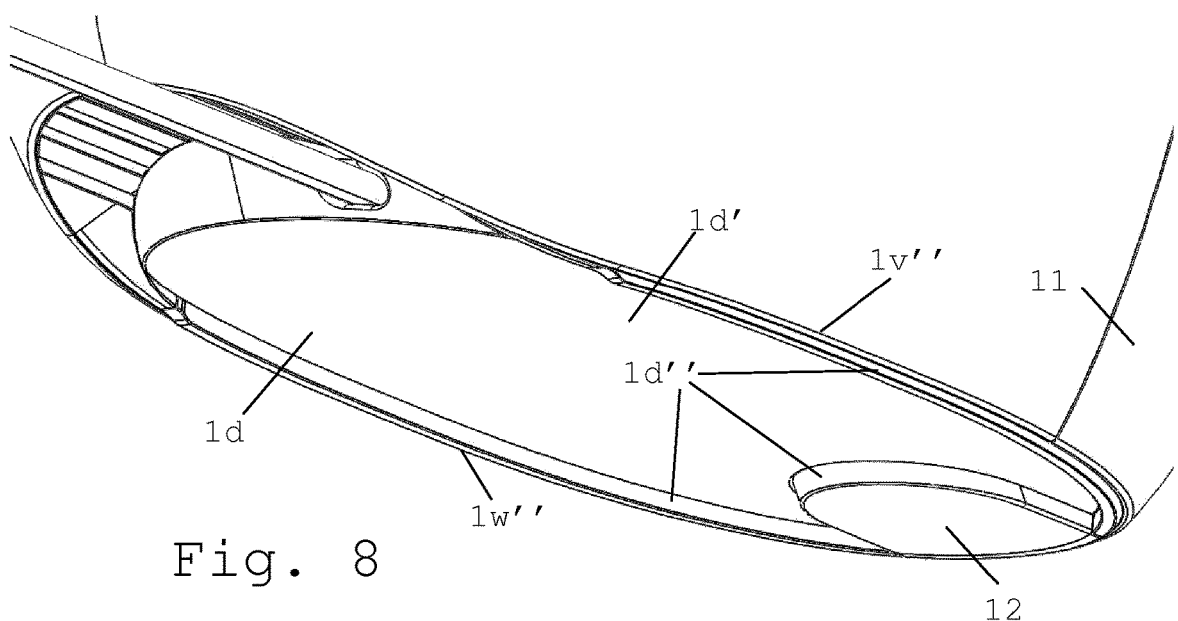

As illustrated in FIGS. 1, 7 and 8, machine 1 can include:
a bottom 1d that has a periphery 1d', bottom 1d forming a foot for placing such machine 1 on an external support surface 100 in an orientation for dispensing a beverage via beverage outlet 1'''; and
an outside face 1b,1c,11,1t,1u,1v,1w,1x that is user-visible when machine 1 is placed on bottom 1d, outside face 1b,1c,11,1t,1u,1v,1w,1x extending along substantially the entire periphery 1d',
For instance, outside face 1b,1c,11,1t,1u,1v,1w,1x delimits an opening of a body inlet 1e for supplying to fluid line 1",1''', e.g. a mixing chamber comprised in the fluid line, a flavouring ingredient. The flavouring ingredient may be supplied within a capsule 2 to the fluid line. See FIGS. 1, 3 and 7.

Body 1' can have an operative mode for driving liquid from inlet 1" to outlet 1''' and an inoperative mode when such machine 1 is switched-off or in a standby mode.

For instance, no outwardly protruding edge 1t',1u',1v',1w', 1x'' that is user-visible in the inoperative mode and that is confined within outside face 1b,1c,11,1t,1u,1v, 1w,1x, has a radius of less than 5 mm, such as a radius of less than 10 mm, e.g. a radius of less than 20 mm, for instance a radius of less than 30 mm.

Optionally one or more outwardly protruding edges 1v''', 1w''' delimited by outside face 1b,1c,11,1t,1u,1v, 1w,1x and bottom 1d at periphery 1d' of bottom 1d and/or one or more outwardly protruding edges 1x''',1x'''' delimited by outside face 1b,1c,11 and body inlet 1e at the opening of the body inlet 1e has/have radii of less than 5 mm, e.g. in the range of 0.1 to 3 mm.

Face 1b,1c,11,1t,1u,1v,1w,1x can extend all over body 1' from periphery 1d' of bottom 1d to the opening of body inlet 1e over bottom 1d to confine body 1'.

Face 1b,1c,11,1t,1u,1v,1w,1x can have outwardly protruding edges 1t',1u',1v',1x', 1x''.

Outside face 1b,1c,11,1t,1u,1v,1w,1x may be made of at least one extremal side 1t,1u, e.g. a front side 1t and/or a rear side 1u, at least two lateral sides 1v,1w extending from extremal side(s) 1t, 1u, and at least one top side 1x, such as lateral and extremal and top sides 1v,1w connected to each other by rounded angles, such as rounded angles having a minimal radius of at least 5 mm, e.g. in the range of 10 to 50 mm. See FIGS. 11 and 7.

Machine 1 can include: a bottom 1d that has a periphery 1d'; and at least one resilient member 1d'' at the periphery 1d' to form a vibration-dampening foot for placing such machine 1 on an external support surface 100 in an orientation for dispensing a beverage via the beverage outlet 1'''. Resilient member 1d'' may be water-repellent and extend generally along the periphery (1d') to prevent passage beyond member 1d'' of water-based liquid on external support surface 100 to underneath bottom 1d. For instance, the water-based liquid is in the form of spills from beverage outlet 1''' or from tank 15. See FIGS. 1, 7 and 8.

Water-repellent and resilient member(s) 1d'' may extend uninterruptedly on each side of periphery 1d' below beverage outlet 1'''.

Member(s) 1d'' can extend uninterruptedly on each side of periphery 1d' below liquid tank 15.

Member(s) 1d'' can be in a generally continuous configuration extending generally along the entire periphery 1d' or at least along a predominant part thereof, such as extending in an uninterrupted configuration along entire periphery 1d'.

Member(s) 1d'' at periphery 1d' of bottom 1d can be configured to space bottom 1d by no more than 2 mm over external support surface 100 at resilient member(s) 1d''.

Member(s) 1d'' at periphery 1d' of bottom 1d may be configured to space bottom 1d by no more than 1 mm, such as no more than 0.5 mm.

For instance, such machine includes an outside face 1b,1c,11,1t,1u,1v,1w,1x extending along substantially the entire periphery 1d' and forms at least one extremal side 1t,1u, e.g. a front side 1t and/or a rear side 1u, and at least two lateral sides 1v, 1w extending from extremal side(s) 1t,1u, and at least one top side 1x, such as lateral and extremal and top sides 1t,1u,1v,1w,1x connected to each other by round or sharp angles. Tank 15 and outlet 1''' may be located at the same or different extremal sides 1t,1u.

Member(s) 1*d''* can extend from under extremal side(s) 1*t*,1*u* at which tank 15 and outlet 1''' are located and extend along and under lateral sides 1*v*,1*w* that extend from said extremal sides(s) 1*t*,1*u*. See FIGS. 1, 3 and 8.

A "round angle" as mentioned above can have a minimal radius of at least 5 mm, e.g. in the range of 10 to 50 mm.

A "sharp angle" as mentioned above may have a maximum radius of 5 mm, e.g. in the range of 0.1 to 3 mm.

The invention claimed is:

1. A machine for preparing a beverage, the machine comprising:
    a body comprising a fluid line extending from a liquid inlet to a beverage outlet;
    a liquid tank that has an outlet connected to the liquid inlet;
    a carrier assembled to the body for carrying the liquid tank,
    the carrier is movable with the liquid tank as a unit inwards into the body into an operative position for supplying liquid to the liquid inlet and outwards from the body into a service position for filling the tank with liquid and/or cleaning the tank, wherein the liquid inlet of the fluid line of the body is fixed to the carrier and is movable with the carrier; and
    a waste collector for collecting waste material, wherein the waste collector is carried by the carrier so that the carrier is movable with the liquid tank and the waste collector as a unit inwards into the body into an operative position for collecting waste material and outwards from the body into a service position for emptying the waste collector.

2. The machine of claim 1, wherein the waste collector is located adjacent to the liquid tank when carried by the carrier.

3. The machine of claim 1, wherein the liquid tank is removable from the carrier in the service position, the outlet of the liquid tank being disconnectable from the liquid inlet.

4. The machine of claim 3, wherein the tank comprises a connector for fastening the tank to the carrier.

5. The machine of claim 1, wherein the tank comprises a handle for lifting the tank and/or for operating a lid of the tank between an open and a closed position.

6. The machine of claim 1, wherein the carrier comprises a holding member holding the tank.

7. The machine of claim 1, wherein the carrier has a holding member holding the tank, and wherein the liquid inlet of the fluid line is fixed to the holding member.

8. The machine of claim 1, wherein the body has an ingredient inlet for supplying to the fluid line.

9. The machine of claim 8, comprising an ingredient supply gate that has an open configuration for allowing a transfer of the flavoring ingredient along the ingredient inlet to the fluid line and a closed configuration for preventing the transfer of the flavoring ingredient along the ingredient inlet to the fluid line.

10. The machine of claim 1, wherein the body defines a seat for receiving the unit.

11. The machine of claim 1, wherein the body comprises a main outside housing.

12. The machine of claim 1, comprising:
    a bottom that has a periphery, the bottom forming a foot for placing such machine on an external support surface in an orientation for dispensing a beverage via the beverage outlet; and
    an outside face that is user-visible when the machine is placed on the bottom, the outside face extending along substantially the entire periphery.

13. The machine of claim 1, comprising:
    a bottom that has a periphery; and
    at least one resilient member at the periphery of the bottom to form a vibration-dampening foot for placing such machine on an external support surface in an orientation for dispensing a beverage via the beverage outlet,
    the resilient member is water-repellent and extends generally along the periphery to prevent passage beyond the member of water-based liquid on the external support surface to underneath the bottom.

14. A machine for preparing a beverage, the machine comprising:
    a body comprising a fluid line extending from a liquid inlet to a beverage outlet;
    a liquid tank that has an outlet connected to the liquid inlet; and
    a carrier assembled to the body for carrying the liquid tank,
    the carrier is movable with the liquid tank as a unit inwards into the body into an operative position for supplying liquid to the liquid inlet and outwards from the body into a service position for filling the tank with liquid and/or cleaning the tank, wherein the liquid inlet of the fluid line of the body is fixed to the carrier and is movable with the carrier, and
    wherein the beverage outlet is mounted in an outlet head of the body that is retractable into a rest position and is deployable into a beverage dispensing position.

15. A machine for preparing a beverage comprising:
    a body comprising a fluid line extending from a liquid inlet to a beverage outlet;
    a liquid tank that has an outlet connected to the liquid inlet;
    a carrier assembled to the body for carrying the liquid tank;
    a waste collector for collecting waste material; and
    the carrier is movable with the liquid tank as a unit inwards into the body into an operative position for supplying liquid to the liquid inlet and outwards from the body into a service position,
    wherein the waste collector is carried by the carrier so that the carrier is movable with the liquid tank and the waste collector as a unit inwards into the body into an operative position for collecting waste material and outwards from the body into a service position for emptying the waste collector.

16. The machine of claim 15, wherein the waste collector is located adjacent to the liquid tank when carried by the carrier.

17. A machine for preparing a beverage comprising:
    a body comprising a fluid line extending from a liquid inlet to a beverage outlet;
    a liquid tank that has an outlet connected to the liquid inlet;
    a carrier assembled to the body for carrying the liquid tank; and
    the carrier is movable with the liquid tank as a unit inwards into the body into an operative position for supplying liquid to the liquid inlet and outwards from the body into a service position,
    wherein the beverage outlet is mounted in an outlet head of the body that is retractable into a rest position and is deployable into a beverage dispensing position.

* * * * *